(12) United States Patent
Gottschalk

(10) Patent No.: US 10,753,366 B2
(45) Date of Patent: Aug. 25, 2020

(54) AUTOMATIC CONTROL SYSTEMS FOR FROST FANS

(71) Applicant: Gary Gottschalk, White Salmon, WA (US)

(72) Inventor: Gary Gottschalk, White Salmon, WA (US)

( * ) Notice: Subject to any disclaimer, the term of this patent is extended or adjusted under 35 U.S.C. 154(b) by 215 days.

(21) Appl. No.: 16/047,147

(22) Filed: Jul. 27, 2018

(65) Prior Publication Data

US 2019/0128269 A1 May 2, 2019

Related U.S. Application Data

(60) Provisional application No. 62/579,667, filed on Oct. 31, 2017, provisional application No. 62/577,676, filed on Oct. 26, 2017.

(51) Int. Cl.
*F04D 27/00* (2006.01)
*F04D 31/00* (2006.01)
(Continued)

(52) U.S. Cl.
CPC .......... *F04D 27/008* (2013.01); *F02D 29/00* (2013.01); *F02D 31/007* (2013.01); *F02D 41/0205* (2013.01); *F02D 41/24* (2013.01); *F02N 11/0803* (2013.01); *F04D 25/022* (2013.01); *F04D 25/08* (2013.01); *F04D 27/001* (2013.01); *F16D 48/064* (2013.01); *G05B 19/054* (2013.01); *F02D 2200/101* (2013.01);
(Continued)

(58) Field of Classification Search
CPC ...... F04D 19/002; F04D 25/08; F04D 25/022; F04D 27/001; F04D 27/008; F04D 2270/303; F02N 11/0803; F02D 29/00; F02D 31/007; F02D 41/0205; F02D 41/24; F02D 2200/101; F02M 7/20; F16D 48/064; F16D 48/06; F16D 2500/3122; F16D 2500/3067; F16D 2500/1023; F16D 2500/1045; F16D 2500/70454; F16D 2500/70424; F16D 2500/1025; F16D 2500/10418; G05D 2219/13144; G05D 2219/1105; G05D 19/054
See application file for complete search history.

(56) References Cited

U.S. PATENT DOCUMENTS

3,667,245 A 6/1972 Till et al.
3,913,713 A 10/1975 F'Geppert
(Continued)

FOREIGN PATENT DOCUMENTS

CN 102900601 B 3/2015

*Primary Examiner* — Charles G Freay
(74) *Attorney, Agent, or Firm* — Kolitch Romano LLP

(57) ABSTRACT

A retrofittable control system for controlling an engine and a clutch of a frost fan may include a data processing system, a thermostat, a human machine interface, a throttle control module, and/or a clutch control module. The control system may be configured to automatically start the fan when the thermostat detects a temperature below a user defined turn-on temperature, and to automatically shut down and park the fan when the thermostat detects a temperature above a user defined turn-off temperature. In some examples, starting up the fan may include running a clutch engagement sequence that engages the clutch at different speeds for different durations.

20 Claims, 7 Drawing Sheets

(51) Int. Cl.

| | |
|---|---|
| *F16D 48/06* | (2006.01) |
| *F02D 31/00* | (2006.01) |
| *F04D 25/08* | (2006.01) |
| *F02D 41/02* | (2006.01) |
| *F02D 41/24* | (2006.01) |
| *G05B 19/05* | (2006.01) |
| *F02N 11/08* | (2006.01) |
| *F02D 29/00* | (2006.01) |
| *F04D 25/02* | (2006.01) |
| *F02M 7/20* | (2006.01) |
| *F04D 19/00* | (2006.01) |

(52) U.S. Cl.
CPC ............ *F02M 7/20* (2013.01); *F04D 19/002* (2013.01); *F05D 2270/303* (2013.01); *F16D 2500/1023* (2013.01); *F16D 2500/1045* (2013.01); *F16D 2500/3067* (2013.01); *F16D 2500/3122* (2013.01); *G05B 2219/1105* (2013.01); *G05B 2219/13144* (2013.01)

(56) References Cited

U.S. PATENT DOCUMENTS

| | | | | |
|---|---|---|---|---|
| 4,270,408 | A | * | 6/1981 | Wagner .................... F02C 6/02 74/402 |
| 4,930,770 | A | * | 6/1990 | Baker ............... A63B 21/00178 482/132 |
| 5,015,926 | A | * | 5/1991 | Casler ................ A63B 21/0058 318/9 |
| 5,569,120 | A | * | 10/1996 | Anjanappa ............. A63B 24/00 482/1 |
| 5,765,672 | A | * | 6/1998 | Briggs .................... F01P 11/14 123/41.11 |
| 6,129,193 | A | | 10/2000 | Link |
| 7,416,068 | B2 | | 8/2008 | Ray et al. |
| 7,777,363 | B2 | | 8/2010 | Wang et al. |
| 8,449,255 | B2 | | 5/2013 | Tadayon et al. |
| 2009/0155094 | A1 | * | 6/2009 | Lee ....................... F16D 35/024 417/223 |
| 2018/0087587 | A1 | * | 3/2018 | Fukuda .................... F16D 48/06 |
| 2018/0162369 | A1 | * | 6/2018 | Colavincenzo .......... B60L 58/15 |
| 2019/0255690 | A1 | * | 8/2019 | Kondou .................... H02K 9/06 |
| 2020/0086849 | A1 | * | 3/2020 | Colavincenzo .......... B60L 53/14 |

* cited by examiner

AUTOMATIC CONTROL SYSTEMS FOR FROST FANS

FIELD

This disclosure relates to systems and methods for automatically controlling the operation of a frost fan or other infrequently-used, high-inertia system. More specifically, the disclosed embodiments relate to an automatic engine and clutch control system suitable for use with frost fans, high-inertia loads, and the like.

INTRODUCTION

Large frost fans, also referred to as frost-protection fans or wind machines, are often used during frost season in orchards or other farms with delicate crops to prevent damage due to freezing temperatures. On cold nights, the coldest air often gathers near the ground near the plants. Large fans can be used to blow the cold air up away from the crop and/or the higher, warmer air down towards the crop. Doing so can raise the temperature of the air around the plants a few critical degrees and prevent significant losses due to frost damage. Frost fans are large fans specifically designed for this purpose. They are often placed near an orchard and, when turned on, blow warmer air from the inversion layer down into the colder air at ground level or vice versa. Frost fans typically have a large engine driving the rotation of a large fan blade assembly, and a clutch that controls engagement of the engine with the fan assembly.

There are many operational and maintenance issues with frost fans. Manually operated fans with manual clutches can require the operator to visit each fan when the temperature drops and the fans should be on. Because of the time needed to turn on each of the fans in an orchard before the temperature drops below a "turn-on temperature," and the time needed to then turn off each of the fans in turn when the temperature rises above a "turn-off temperature," manual fans can end up running much longer than they need to, using a significant amount of extra fuel. As such, a fan which operates automatically has significant advantages; an automatic fan saves large amounts of fuel, reduces the run time of the fans and thus increases their lifetime, and decreases the hassle of visiting each fan in person. However, known solutions include centrifugal clutches, which are very expensive to purchase and install. In addition, centrifugal clutches cannot typically be engaged unless the engine is running. Accordingly, when the engine is off, the fan spins freely in the wind (including in a reverse direction). Among other things, this can significantly decrease the lifetime of the associated gearbox, as it puts unnecessary wear on the gears, including in an unlubricated direction. Automatic fans can also be unreliable due to issues with battery power being exhausted during the lengthy times between uses. The control box typically remains on to detect a drop in temperature, which uses up a significant amount of power over time.

SUMMARY

The present disclosure provides systems, apparatuses, and methods relating to automatic controls for frost fans and the like.

In some embodiments, a high-inertia fan system may include a fan blade assembly including a plurality of fan blades rotatably coupled to a reduction gear; an engine configured to spin the fan blade assembly via the reduction gear; a clutch assembly configured to selectively engage a drive shaft of the engine with a load shaft of the reduction gear, the clutch assembly comprising a non-centrifugal, friction clutch operable by a linear actuator driven by a direct current (DC) motor and operatively connected to the clutch; a thermostat configured to sense an ambient temperature; and an electronic controller in communication with the thermostat, the engine, and the clutch assembly, the controller having one or more processors and a memory, a plurality of instructions being stored in the memory and executable by the one or more processors to automatically: disengage the clutch in response to a first signal from the thermostat that the ambient temperature has fallen below a first threshold; start the engine and adjust a speed of the engine by controlling a fuel throttle of the engine; cause the linear actuator to actuate the clutch at a first actuation speed for a first duration, then actuate the clutch at a second actuation speed lower than the first actuation speed for a second duration, then actuate the clutch at a third actuation speed higher than the second actuation speed for a third duration, such that the fan blades are brought up to an operating speed without stalling the engine; run the fan blade assembly at an operating speed; slow the speed of the engine and disengage the clutch in response to a second signal from the thermostat that the ambient temperature has risen above a second threshold; and engage the clutch in response to stopping of the engine and the fan blade assembly, thereby preventing rotation of the fan blades.

In some embodiments, a frost fan system for protecting crops from frost may include a fan blade assembly including a plurality of fan blades rotatably coupled to a reduction gear; an engine configured to spin the fan blade assembly via the reduction gear; a clutch assembly configured to selectively engage a drive shaft of the engine with a load shaft of the reduction gear, the clutch assembly comprising a non-centrifugal, friction clutch and a manual clutch engagement mechanism; an environmental sensor configured to sense an environmental parameter; a clutch control system including a linear actuator coupled to the clutch engagement mechanism, the clutch control system further comprising an electronic controller in communication with the environmental sensor and the engine; wherein the electronic controller is configured to automatically: start the engine in response to a signal from the environmental sensor indicating that the environmental parameter has met a first threshold; engage the clutch by causing the linear actuator to move the clutch engagement mechanism into an engaged position; run the fan blade assembly at an operating speed; and slow the engine and disengage the clutch in response to a second signal from the environmental sensor that the environmental parameter has met a second threshold.

In some embodiments, a method of retrofitting a clutch control system on a non-centrifugal clutch may include coupling a motor-driven linear actuator to a manual clutch engagement mechanism of a non-centrifugal clutch of a frost fan assembly; placing an electronic controller in communication with an engine configured to drive the frost fan assembly and with a motor of the motor-driven linear actuator; and using the electronic controller to selectively engage and disengage the clutch by controlling the motor to cause the linear actuator to position the manual clutch engagement mechanism.

Features, functions, and advantages may be achieved independently in various embodiments of the present disclosure, or may be combined in yet other embodiments, further details of which can be seen with reference to the following description and drawings.

DETAILED DESCRIPTION

Figure 1:
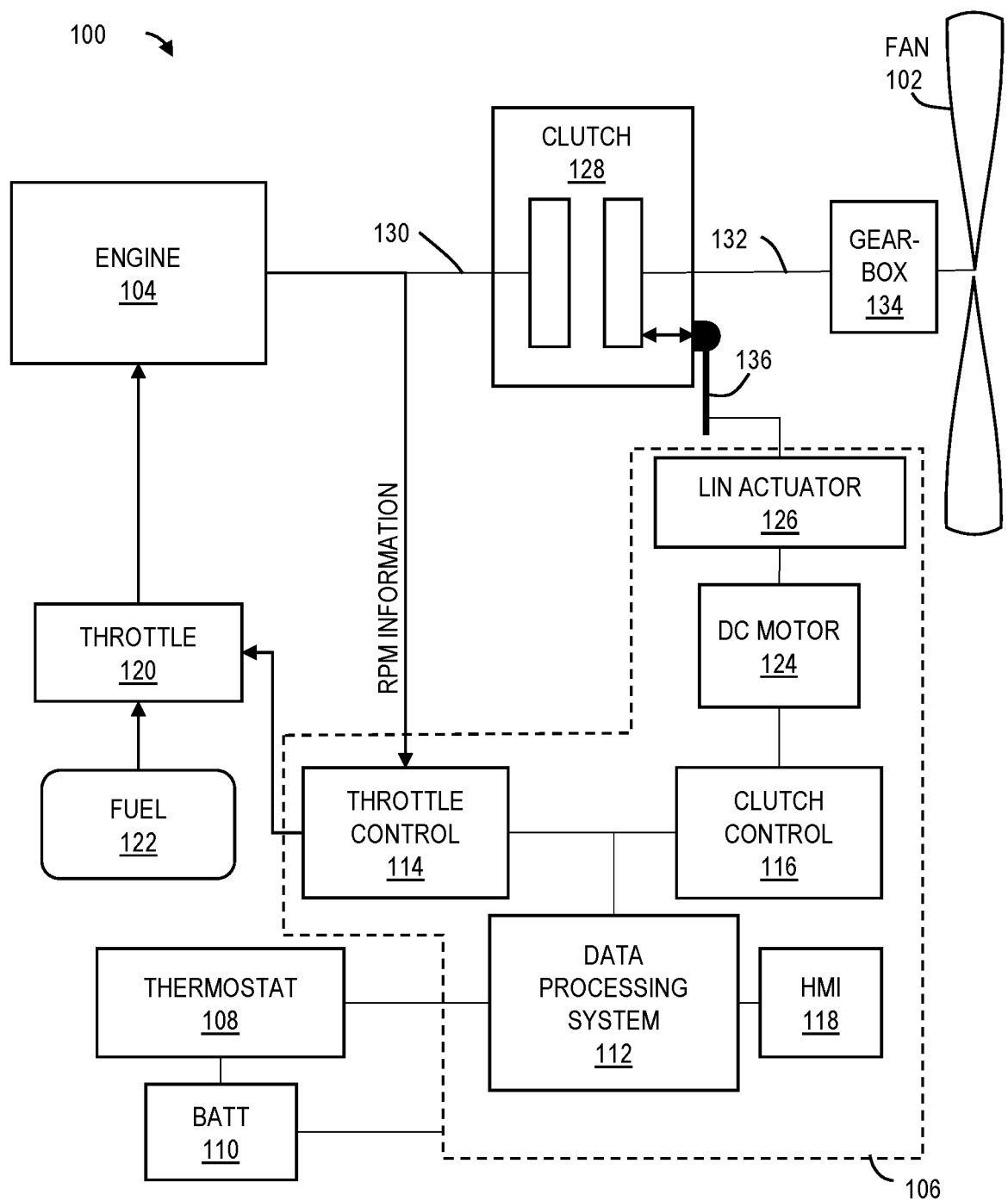
FIG. 1 is a schematic diagram of an illustrative frost fan having a clutch control system according to aspects of the present disclosure.

Various aspects and examples of an automatic frost fan controller configured to reliably control an engine and a clutch of the fan, as well as related methods, are described below and illustrated in the associated drawings. Unless otherwise specified, an automatic frost fan controller and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Automatic frost fan controllers according to the present teachings overcome the issues described above by providing reliable automatic control of a non-centrifugal clutch; the controller uses an automatic pulsed engagement of the clutch to obtain benefits of a centrifugal clutch (among others) without the associated cost. Accordingly, the benefits of automatic control of the frost fan are combined with the benefits of a manual clutch, e.g., lower cost and the ability to engage the clutch while the engine is not running, thereby parking the fan and preventing it from spinning freely. In addition, the control system can be easily and quickly retrofitted to existing fans having manual clutches.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through H, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

Directional terms such as "up," "down," "vertical," "horizontal," and the like should be understood with respect to the Earth and in the context of a frost fan in its installed or operational configuration.

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

In general, systems and methods are described herein for controlling a frost fan (or other relatively high-inertia system) having an engine selectively coupled to a fan (or other load) by a non-centrifugal friction clutch. The disclosed systems and methods may include a controller configured to automatically operate large fans in an efficient, reliable, and less damaging manner than other known systems. Although the control systems and methods are generally described in the context of a large frost fan, such as those used in orchards, other applications are within the scope of the present disclosure, such as centrifugal pumps (e.g., for irrigation) and other high-inertia, intermittently-used, rotating devices.

Control systems described herein allow for reliable automatic operation of a frost fan, and may be retrofitted onto an existing manual-clutch fan. These systems may include one or more linear actuators coupled to a linearly-applied clutch (e.g., coupled to an existing handle of a manual clutch engagement mechanism), the actuators being configured to selectively engage and disengage an engine of the fan system with respect to a fan blade assembly. The control system may include a DC motor for operating the linear actuator, and/or a throttle control module for engine speed regulation.

Embodiments of the control system include a pulsed-engagement algorithm which, for example, allows the fan blade assembly to come up to speed without stalling the engine or causing undue stress and/or wear on the gearbox or clutch. This functionality enables the system to safely handle much heavier fan blade assemblies than a manual clutch, thereby providing centrifugal clutch-like performance.

Parameters of the pulsed-engagement algorithm (e.g., pulse length, overall duration, etc.) can be adjusted as needed to adapt to different fan weights. This mechanism avoids the high cost associated with using a centrifugal clutch, while also facilitating beneficial features not possible with a centrifugal or a manual clutch. For example, clutches of the present disclosure may be engaged (e.g., automatically) when the system is off, thereby avoiding the free-spin issues associated with centrifugal clutches and lengthening the fan's operational lifespan.

Examples, Components, and Alternatives

The following sections describe selected aspects of exemplary automatic control systems suitable for use on frost fans as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Frost Fan System

As shown in FIG. 1, this section describes a frost fan system 100 having a non-centrifugal friction clutch and an automatic clutch control system. Frost fan system 100 (also referred to as a frost fan) is an example of a frost fan having an automatic control system, described above.

Frost fan 100 includes a fan blade assembly 102, an engine 104 selectively connectible to the fan blade assembly by a clutch 128, a control system 106 (also referred to as the controller) for controlling the engine and the clutch, and a thermostat 108 for triggering certain actions. Fan blade assembly 102 may include any suitable structures configured as a fan or impeller, e.g., depending on the application and characteristics of the fan. For example, fan blade assembly 102 may include two to six fan blades, each of which may be approximately one to approximately five feet or more (e.g., ten feet, 18 feet, etc.) in length. In some examples, each of the fan blades may be greater than approximately three feet in length.

Thermostat 108 may include any suitable device configured to sense environmental temperature and send a signal to control system 106 when the environmental temperature meets certain criteria (e.g., temperature above or below one or more defined thresholds). Additionally or alternatively, the environmental temperature may be referred to as an ambient temperature and/or an outdoor temperature. Accordingly, thermostat 108 is in communication with control system 106. A power storage device, such as a battery 110, is used to power thermostat 108 and/or controller 106. In some examples, the power storage device is configured to store power generated by one or more solar cells, solar cell modules, and/or solar panels coupled to the power storage device.

Control system 106 may include any suitable device configured to automatically control one or more other components of frost fan 100 according to defined parameters and algorithm(s). For example, control system 106 may include a data processing system 112 (i.e., a computer), a throttle control module 114, and a clutch control module 116. One or more of these subsystems may be implemented using a programmable logic controller (PLC) (see Section F). Some or all of the components of control system 106 may be combined into a single device or module. User interaction with the control system may be conducted via a human machine interface (HMI) 118, which may include a touch screen and/or graphical user interface. Data processing system 112 (see Section E), or any other suitable portion of control system 106, is in communication with thermostat 108 to receive appropriate trigger signals. In the example shown in FIG. 1, the data processing system manages and/or implements throttle control module 114 and clutch control module 116.

Throttle control module 114 is configured to control a throttle 120 (e.g., a throttle valve) of engine 104 to meter the amount of fuel 122 and/or air provided to engine 104. Throttle control module 114 may, for example, control throttle 120 via a DC motor operatively connected to a linear actuator (e.g., a gear drive or the like). Any suitable fuel may be utilized, e.g., depending on the application and characteristics of the engine. For example, suitable fuels may include gasoline, diesel, propane, and/or hydrogen gas. In some examples, a suitable engine may include an engine fueled by propane. Throttle control module 120 may also receive real-time speed information (e.g., in rotations per minute, RPM) from engine 104. This feedback is used to monitor engine response to the throttle control and to allow control system 106 to respond to the actual condition of engine 104.

Clutch control module 116 is configured to operate clutch 128. In this example, clutch control module 116 controls a DC motor 124 operatively connected to a linear actuator 126. Linear actuator 126 may include any suitable mechanism configured to convert rotary motion from the DC motor into linear motion of an actuator, e.g., using a leadscrew, a cam, and/or the like. In some examples, hydraulic and/or pneumatic pressure may be used instead of (or in addition to) the motor.

Clutch 128 includes a manual engagement mechanism 136, e.g., a handle, lever, or similar structure configured to engage and/or disengage the clutch by hand. Clutch engagement mechanism 136 is typically present on clutches used with frost fans and the like, such that the mechanism may comprise original components in place prior to installation of the linear actuator. A mechanical output of linear actuator 126 is coupled to clutch 128, e.g., via mechanism 136, such that the linear actuator operates the clutch in both engaging and disengaging directions. In some examples, the linear actuator is coupled to clutch 128 directly. However, coupling the linear actuator to manual engagement mechanism 136 allows the system to take advantage of existing components and enables straightforward retrofitting without increasing clutch mechanism complexity.

In some examples, one or more position feedback sensors are configured to sense information related to a position of linear actuator 126 (and therefore a position of clutch 128) and to communicate the sensed information to clutch control module 116. Examples of suitable position feedback sensors may include optical sensors, magnetic sensors, physical contact sensors, potentiometer sensors, and/or the like. In some examples, the position feedback sensors are configured to sense whether linear actuator 126 is fully extended (i.e., engaged) and/or fully retracted (i.e., disengaged). Additionally, or alternatively, the position feedback sensors may be configured to sense how far linear actuator 126 is extended (e.g., as a fraction of the maximum extension of the actuator).

Clutch 128 may include any suitable friction-type, non-centrifugal clutch configured to selectively engage a drive side shaft 130 with a load side shaft 132. In this example, clutch 128 is coupled on the load side to fan blade assembly 102 via a gear box 134. Gear box 134 may include any suitable reduction gear system configured to reduce the high speed input of the drive shaft to a slower, more suitable speed for the fan blade assembly. In some examples, gear box 134 includes two or more gear assemblies interconnected by respective drive lines. For example, a first gear box may be directly coupled to clutch 128, a second gear box may be directly coupled to fan blade assembly 102, and the first and second gear boxes may be coupled to each other by a drive line. In some examples, the first gear box is disposed at the base of a tower supporting fan blade assembly 102, and the second gear box is disposed at the top of the tower (e.g., adjacent the fan blade assembly).

B. First Illustrative Method—Overview of Automatic Fan Control

Figure 2:
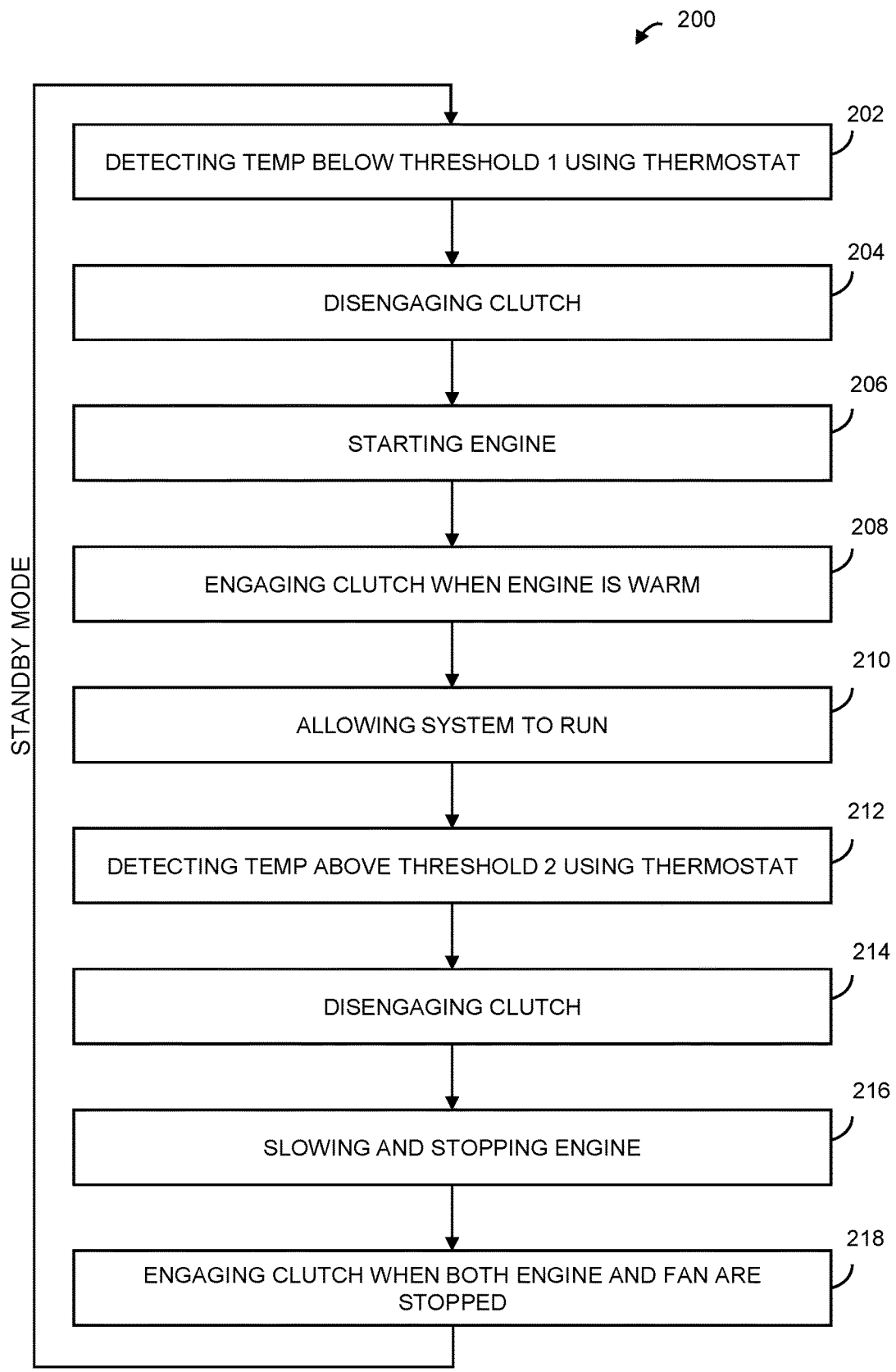
FIG. 2 is a flowchart depicting steps of an illustrative method for automatically operating a frost fan.

This section describes steps of an illustrative method 200 for automatic control of a frost fan by a control system as taught herein; see FIG. 2. Aspects of system 100 and/or other automatic control systems may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. Although various steps of method 200 are described below and depicted in FIG. 2, the steps need not necessarily all be performed, and in some cases may be performed simultaneously or in a different order than the order shown.

Step 202 of method 200 includes detecting that an ambient temperature has met (e.g., fallen below or above) a selected (e.g., user-defined) first threshold (e.g., a "turn-on temperature") using a thermostat, such as thermostat 108 of system 100. Additionally or alternatively, step 202 may include detecting that an environmental property (or properties) other than temperature has met a selected "turn-on" threshold associated with that property. Suitable environmental properties may include a relative humidity, a wind speed, an air pressure, and/or the like. In response to detecting this event, step 204 includes disengaging the clutch (e.g., clutch 128) from the fan blade assembly (e.g., fan 102).

To further conserve power for off-grid installations, certain functionality in the thermostat can be powered off when the system is in standby. For example, the display and relays may be powered off to reduce power down to a few miliamps or less.

Step 202 may include remote access to allow monitoring and control of the system, e.g., by receiving commands and/or reporting over cellular, LoRA, or other digital networks, e.g., to a remote monitoring station including a computer or smart phone. The reporting periodicity of the system can be varied, based on time of day, season, temperature, or other environmental parameters, or selected manually by the user. This results in power savings achieved by powering the communications devices down except when in transmission mode. As an example, if it is during that time of year and day where a frost event is expected, the system might report more frequently (e.g., every 10 minutes). However, if it is not the appropriate season or time of day, data might be transmitted only once every hour.

Step 206 then includes starting the engine (e.g., engine 104) in response to detection of the threshold event, and step 208 includes engaging the clutch once the engine has warmed up sufficiently. Warming up sufficiently may be established by waiting for a selected period of time, such as three or four minutes. In some examples, starting the engine and/or controlling a speed of the engine may include controlling a fuel throttle of the engine. At step 210, the system is allowed to run, during which time a set of steady-state controls (e.g., algorithms) may maintain fan speed, monitor for problem conditions, etc.

Step 212 includes detecting that the ambient temperature has met (e.g., risen above or fallen below) a selected (e.g., user-defined) second threshold (e.g., a "turn-off temperature"), again using the thermostat. Additionally or alternatively, step 212 may include detecting that an environmental property (or properties) other than temperature has passed a selected "turn-off" threshold associated with that property (see step 202 above). Upon detecting this event, step 214 includes disengaging the clutch. Step 216 includes slowing and stopping the engine, which may include, e.g., a three or four minute cool-down period. Step 218 includes automatically engaging the clutch in response to both the engine and the fan ceasing to move. Unlike with a centrifugal clutch, clutches of the present disclosure may be automatically engaged with the fan stopped (e.g., using linear actuator 126 and mechanism 136). Moreover, the clutch may remain engaged after power is removed from the system, because the linear actuator is configured to remain in its present position unless otherwise acted upon (e.g., commanded or actively caused to reposition).

When not performing method 200 (e.g., before and/or after performing method 200), the frost fan system may be in a low-power (or no-power) standby mode. The low-power standby mode may be referred to as a standby mode and/or a low-power mode. When in the low-power standby mode, one or more portions of the control system may be powered off, e.g., leaving the thermostat as the only component of the frost fan system drawing power from the battery (e.g., battery 110). This may greatly increase battery life, as the thermostat draws a small amount of power relative to other aspects of the system. In some examples, the thermostat may draw as little as approximately 10 milliamps. In some examples, the controller may be on and/or may draw power for some of the time when the frost fan system is in the low-power standby mode. By turning off the controller for some or all of the time when the system is in the low-power standby mode, the amount of power used by the system may be significantly reduced. This mode of operation is facilitated by configuring the system to power on when the thermostat sends a triggering signal. This triggering signal may be sent, for example, in response to the ambient temperature falling below the first threshold (as described above), or by any other suitable event, such as falling below a different (e.g., higher) threshold temperature. In some examples, step 202 may trigger a power-up of the controller(s).

In some examples, the frost fan system includes additional safety features. For example, step 204 may additionally include sounding a horn prior to disengaging the clutch. In some examples, a horn, bell, buzzer, and/or other audible signal and/or any other suitable (e.g., visual) indicator may be sounded and/or activated at any point in method 200. Such an indicator may be used to alert nearby people, such as workers and/or operators, that the frost fan system is about to begin method 200 and/or one or more steps of method 200.

In some examples, an additional safety feature includes the control system disabling the frost fan system in response to sensing a malfunction. In some examples, if the control system senses a malfunction, an operator action (e.g., pressing an override button or entering a password) may be required before the frost fan system can restart.

C. Second Illustrative Method—Clutch Engagement Mode

Figure 3:
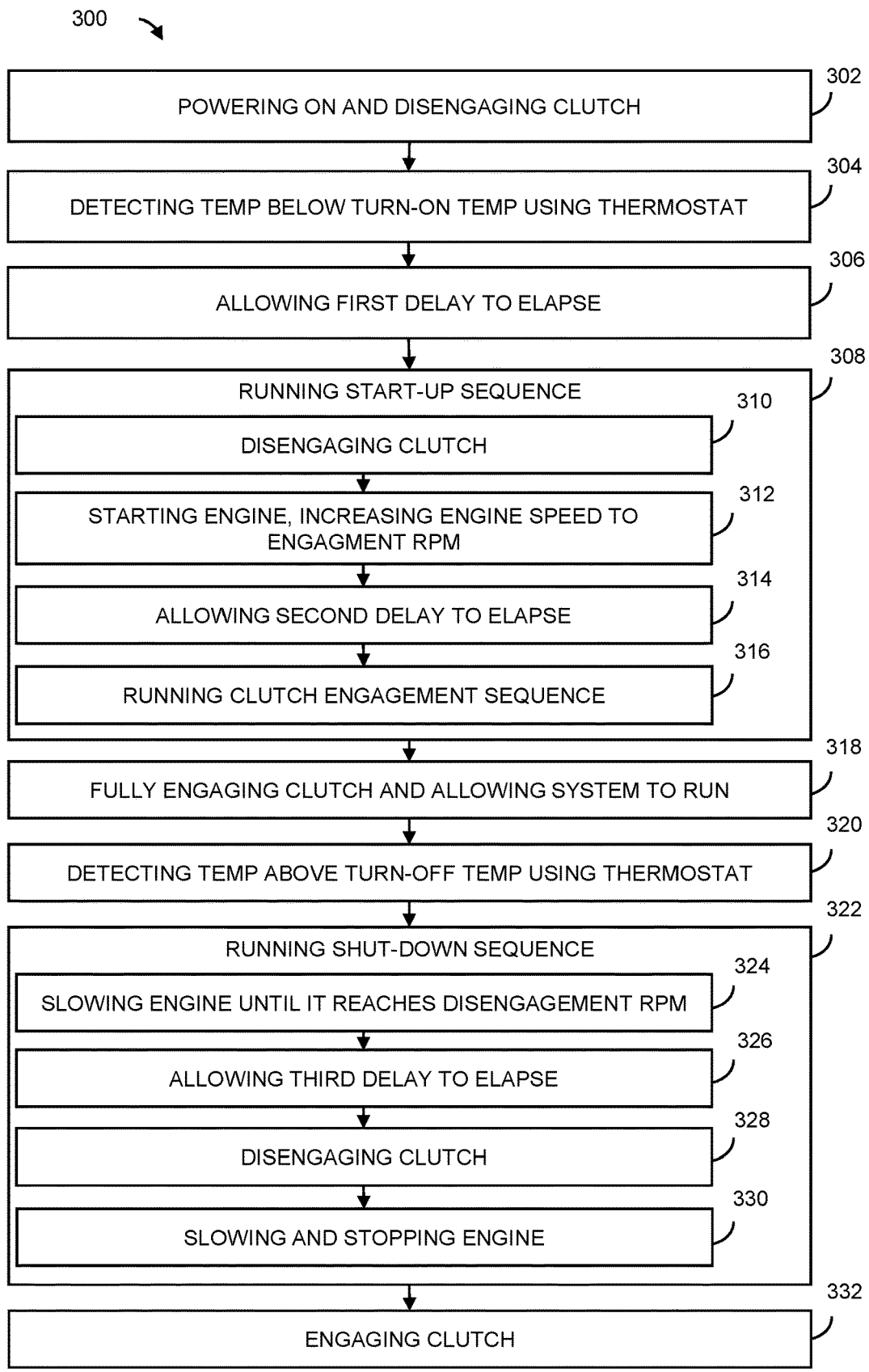
FIG. 3 is a flowchart depicting steps of an illustrative method for automatically operating a frost fan using a pulsed engagement of the clutch as described herein.

This section describes steps of an illustrative method 300 for automatic control of a frost fan by a control system including pulsed engagement of a clutch; see FIG. 3. Aspects of system 100 and/or other frost fan control systems may be utilized in the method steps described below. Where appropriate, reference may be made to components and systems that may be used in carrying out each step. These references are for illustration, and are not intended to limit the possible ways of carrying out any particular step of the method.

FIG. 3 is a flowchart illustrating steps performed in an illustrative method, and may not recite the complete process or all steps of the method. Although various steps of method 300 are described below and depicted in FIG. 3, the steps need not necessarily all be performed, and in some cases may be performed simultaneously or in a different order than the order shown.

Method 300 is an illustrative embodiment of overview method 200 (see FIG. 2). In general, method 300 may be considered a selected mode of operation suitable for implementing method 200, e.g., on frost fan system 100.

At step 302, the control system powers on and disengages the clutch. In some examples, powering on of the control system may be initiated by a user. In some examples, the control system may be in automatic operation mode upon power-up. In some examples, the control system may be in some other mode of operation upon power-up and may subsequently be switched to automatic operation mode by a user.

At step 304, the control system detects that a sensed environmental variable has satisfied a first threshold. For example, the control system may detect that an ambient (e.g., outdoor) temperature has fallen below a defined first threshold, referred to here as the turn-on temperature. Any suitable first threshold or turn-on temperature may be utilized, e.g., depending on the application and characteristics of the fan and/or thermostat. For example, a first threshold may be approximately 30 degrees Fahrenheit (F) to approximately 34 F. In some examples, a suitable first threshold temperature may be approximately 32 F. In some examples, a first threshold temperature may be defined in relation to a second threshold or turn-off temperature (described below). For example, a temperature differential may be defined, e.g., approximately 4 F, such that the turn-on temperature is four degrees less than the turn-off temperature.

In some examples, the detection of the outdoor/ambient temperature may be executed by a thermostat (e.g., thermostat 108). In some examples, the thermostat may signal the control system in response to detection of the turn-on temperature event. In some examples, the frost fan system may be in the low-power standby mode, in which the control system is turned off to save power, and step 304 may include the thermostat signaling the control system to power on. In some examples, the control system may periodically query the thermostat and compare the current temperature to the defined turn-on temperature. As described above, other environmental properties such as relative humidity, amount of precipitation, wind speed, and/or the like may be detected in addition to, or instead of, temperature. Devices configured to measure one or more of these environmental properties may signal the control system in response to detection of a turn-on event associated with the corresponding environmental property. For example, a turn-on event may include detection of a wind speed below a selected threshold. The processing logic for this may be disposed in the controller and/or in a separate programmable logic system.

At step 306, the control system allows a first delay to elapse. The first delay may also be referred to as a "start delay." Any suitable start delay may be utilized, e.g., depending on the application and characteristics of the fan. For example, a start delay may be approximately two or three seconds to approximately two or three minutes. In some examples, the start delay may be zero or may be user defined. After the start delay has elapsed, the control system proceeds to step 308, in which the control system runs through a startup sequence. In some examples, the start delay may function as a safety measure. For example, if a turn-on temperature event is detected, the system may warn the user that fan start-up is imminent before continuing. In some examples, the system may warn the user through use of an indicator such as a horn and/or buzzer. In some examples, the start delay may function as a dead band or hysteresis mechanism. For example, the system may recheck the thermostat output after the start delay has expired to verify that the low temperature was more than a brief excursion.

The startup sequence of step 308 includes multiple sub-steps. At sub-step 310, the control system disengages the clutch. At sub-step 312, the control system starts the engine and increases the engine speed until it reaches an engagement RPM, at which point sub-step 314 includes allowing a second delay to elapse. In some examples, starting the engine, increasing the engine speed, and/or decreasing the engine speed may be accomplished by controlling a fuel throttle of the engine (e.g., by operating a DC motor or other prime mover configured to control a position of a linear actuator coupled to the throttle). Any suitable engagement speed or RPM may be utilized, e.g., depending on the application and characteristics of the fan. For example, an engagement RPM may be defined to be approximately 1000 to approximately 2000 RPM. In some examples, a suitable engagement RPM may be approximately 1200 RPM. The second delay may also be referred to as a "clutch stroke engage delay." Any suitable clutch stroke engage delay may be utilized, e.g., depending on the application and characteristics of the fan. For example, a clutch stroke engage delay may be approximately ten seconds to approximately one minute. In some examples, a suitable clutch stroke engage delay may be approximately 30 seconds. In some examples, this clutch stroke engage delay may be user defined.

At sub-step 316, the control system runs a clutch engagement sequence. This clutch engagement sequence is described further below, with respect to method 400.

After the clutch engagement sequence is finished, the control system will proceed to step 318, which includes fully engaging the clutch and allowing the fan to run at operating speeds. Any suitable operating speed may be utilized, e.g., depending on the application and characteristics of the fan. For example, operating speeds may be approximately 2000 to approximately 3000 RPM. In some examples, a suitable operating speed may be approximately 2300 RPM. The fan may run as long as necessary and/or until the turn-off temperature is reached.

At step 320 the control system detects that outdoor and/or ambient temperature has risen above a defined second threshold, also referred to as the turn-off temperature. Any suitable second threshold or turn-off temperature may be utilized, e.g., depending on the application and characteristics of the fan and/or thermostat. For example, a turn-off temperature may be approximately 34 F to approximately 38

F. In some examples, a suitable turn-off temperature may be approximately 35 or 36 F. In some examples, the detection of this event may be executed by a thermostat, e.g., thermostat 108. In some examples, the thermostat may signal the control system when an outdoor/ambient temperature above the user defined turn-off temperature is reached. In some examples, the control system may periodically query the thermostat and compare the current outdoor and/or ambient temperature to the user defined turn-on temperature. As indicated above with respect to step 304, the detected environmental variable (in some examples) may be something other than temperature.

Once the turn-off temperature event is detected, the control system proceeds to step 322, in which the control system runs through a shut-down sequence. Step 322 includes multiple sub-steps.

At sub-step 324, the control system slows the engine until it reaches a defined disengagement RPM. In some examples, starting the engine, increasing the engine speed, and/or decreasing the engine speed may be accomplished by controlling a fuel throttle of the engine. Any suitable disengagement speed or disengagement RPM may be utilized, e.g., depending on the application and characteristics of the fan. For example, a disengagement RPM may be defined to be approximately 1000 to approximately 2000 RPM. In some examples, a suitable disengagement RPM may be approximately 1200 RPM.

At sub-step 326, the control system allows a third delay to elapse. The third delay may also be known as a "clutch disengagement delay." Any suitable clutch disengage delay may be utilized, e.g., depending on the application and characteristics of the fan. For example, a clutch disengage delay may be approximately one to approximately 30 seconds. In some examples, a suitable clutch engage delay may be approximately two seconds. In some examples, the clutch disengagement delay may be user defined. After the third delay has elapsed, the control system disengages the clutch in step 328. Step 328 may further include, allowing the engine to dissipate heat prior to stopping the engine at sub-step 330, e.g., by running a cooldown cycle for a predetermined period of time, and/or until the engine has cooled to a predetermined temperature. At sub-step 330, the engine slows and stops.

After the engine has fully stopped, the control system may be configured to automatically engage the clutch, at step 332. Engaging the clutch while the engine is stopped prevents the fan from spinning freely, for example in an unlubricated direction. This can lengthen the lifetime of the gearbox by preventing unnecessary wear and tear.

D. Third Illustrative Method—Pulsed Clutch Engagement Sequence

Figure 4:
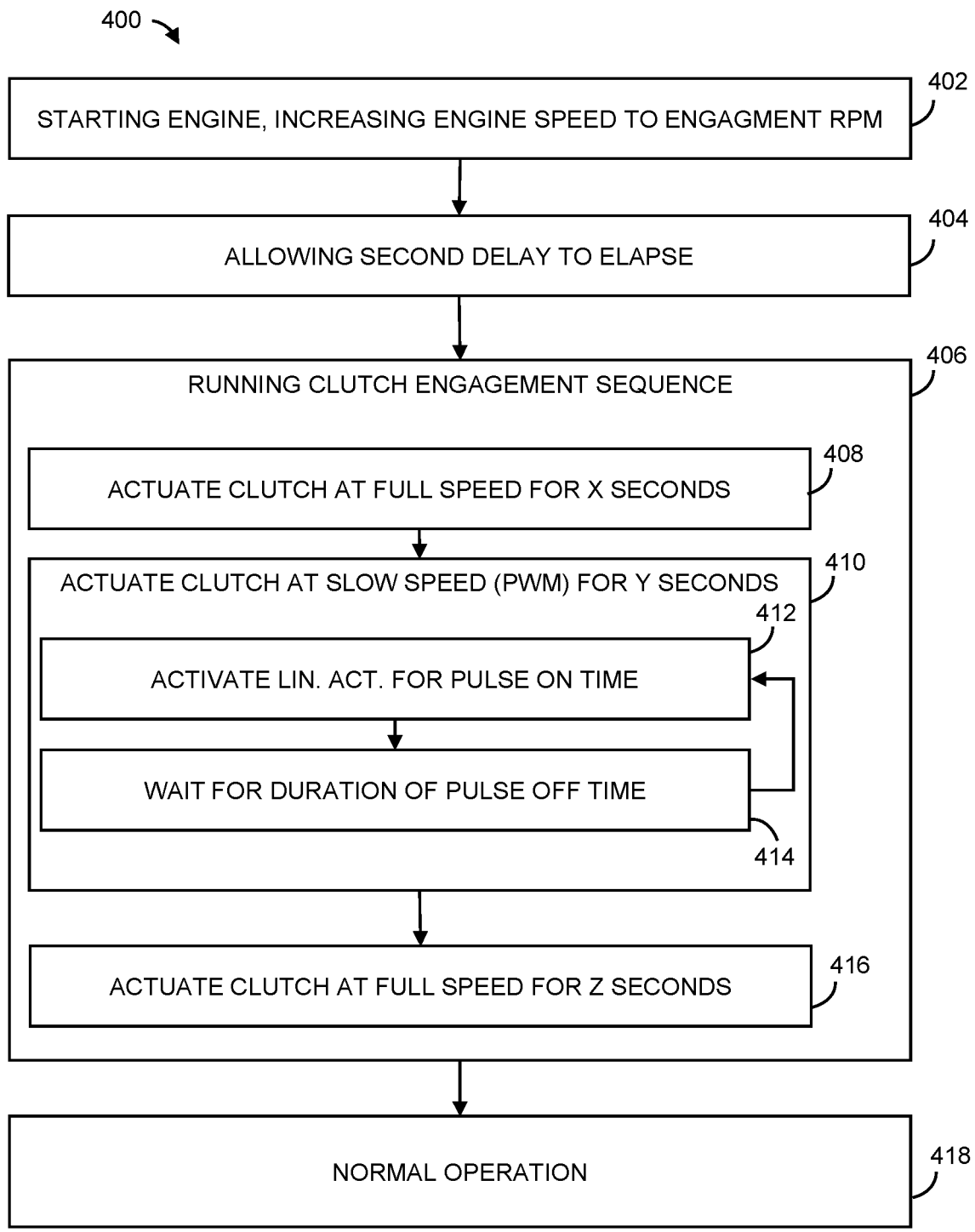
FIG. 4 is a flowchart depicting steps of an illustrative method for pulsed engagement of the clutch of a frost fan as described herein.

This section describes steps of an illustrative method 400 for automatic engagement of a clutch, for example, when used on a frost fan; see FIG. 4. Aspects of system 100 and/or other frost fan control systems may be utilized in the method steps described below. Where appropriate, reference may be made to components and systems that may be used in carrying out each step. These references are for illustration, and are not intended to limit the possible ways of carrying out any particular step of the method.

FIG. 4 is a flowchart illustrating steps performed in an illustrative method, and may not recite the complete process or all steps of the method. Although various steps of method 400 are described below and depicted in FIG. 4, the steps need not necessarily all be performed, and in some cases may be performed simultaneously or in a different order than the order shown.

Method 400 is an illustrative embodiment of the clutch engagement process described above with respect to method 300. At step 402, the controller starts the engine and increases the engine speed until it reaches the engagement RPM. In some examples, step 402 may be substantially identical to sub-step 312. At step 404, the controller allows the second delay to elapse. In some examples, step 404 may be substantially identical to sub-step 314. Steps 402 and 404 are provided here for context.

At step 406, the controller runs a pulsed (e.g., PWM) clutch engagement sequence. Step 406 corresponds to sub-step 316. Step 406 has multiple sub-steps.

At sub-step 408, the controller actuates the clutch at full engagement speed for a first duration of time (e.g., x seconds) to bring the clutch into a near-engagement position. This is done by activating the linear actuator (e.g., at full operating voltage) and thereby altering the position of the clutch engagement mechanism. The linear actuator may be extended a predetermined distance. This duration of time may be user selectable. Additionally or alternatively, step 408 may be performed until the linear actuator reaches a selected position (e.g., as measured by a position switch or detector).

At sub-step 410, the controller actuates the clutch at less than full engagement speed for a second duration of time (e.g., y seconds) to cause partial engagement of the clutch plates and consequently a slipping of the clutch. In some examples, this may include engaging the clutch at a 50% level or at any other percentage of full engagement that is suitable for starting the fan spinning without stalling the engine.

The speed of actuation utilized in sub-step 410 is less than full speed due to a pulsing of the voltage supplied to the DC motor that operates the linear actuator. Specifically, a sort of pulse width modulation (PWM) may be utilized to effectively reduce the average voltage supplied to the DC motor. In actuality, the full voltage is applied, but in a pulsed or square-wave fashion. Accordingly, sub-steps 412 and 414 include repeatedly activating the linear actuator for a selected "pulse on time," then waiting for a selected "pulse off time." Sub-steps 412 and 414 are repeated a plurality of times, with a pulse cycle being defined as one execution of both sub-steps 412 and 414. The user may define or select a number of cycles to be repeated, referred to as the "pulse stroke cycles." Moreover, the pulse on and off times may be user-defined variables. In some examples, pulses may be set to approximately 50 milliseconds (ms) on and 50 ms off, e.g., to reduce effective actuation speed to about 50%. Any suitable pulse on or off time may be utilized, e.g., depending on the application and characteristics of the fan. Additionally or alternatively, pulse on and/or off times may be different for each of the clutch pulse cycles.

In some examples, the number of seconds (y) during which clutch pulse cycles continue is selectable by a user. In other words, the PWM phase may be repeated for a user-selected duration. Additionally or alternatively, step 410 may be performed until the linear actuator reaches a selected position and/or the fan assembly reaches a selected speed.

At step 416, when step 410 is complete, e.g., as determined by the elapsed duration of time y (e.g., 2-5 seconds), the controller actuates the clutch at full engagement speed for a third duration of time (e.g., z seconds) to cause full engagement of the clutch. Again, this third duration of time may be user selectable. Additionally or alternatively, step 416 may be performed until the linear actuator reaches a selected position (e.g., as measured by a position switch or detector).

Position sensors may be configured to sense an extent to which the linear actuator has extended, and/or whether the linear actuator is fully extended or retracted. Information from the position sensors may be used (e.g., as feedback) by a controller when extending the linear actuator for the predetermined distances and/or amount of time. In both the clutch engage and the clutch disengage processes, actuator end-of-travel indicators are optionally used to provide feedback with respect to clutch actuator completion. If engagement or disengagement are not completed within a specified time, a warning or error flag may be raised so that appropriate action can be taken by the controller.

At step 418, in response to completion of step 416, the controller fully engages the clutch if not already completed and enters a normal or steady-state operation mode. The controller may only proceed to step 418 once certain criteria are met. In some examples, criteria may include reaching a selected minimum percentage of operational fan rotation speed.

In some examples, the actuator has one or more limit switches that prevent overtravel. Accordingly, as long as the engagement time covers the full length of travel (or more), full engagement can be assumed. This amount of time may be determined during initial testing and setup. Additionally or alternatively, end-of-travel feedback is utilized to test for full engagement (or disengagement). This provides deterministic feedback that full engagement or disengagement was achieved.

In an alternative method, referred to here as the Loaded Engine Feedback Approach, clutch engagement may be initiated during the engine warmup cycle based on engine speed (for example, when the engine speed is between a "Clutch Engage RPM" and a "Max Clutch Engage RPM"). In this method, when engagement has started, engagement will pause automatically if engine speed falls below a "Min Clutch Engage RPM." This minimum may be calculated by subtracting a "Hysteresis RPM" (or "Deadband RPM") from the "Clutch Engage RPM." During engagement, if the "Max Clutch Engage RPM" is exceeded, engagement automatically pauses until engine speed again falls below the "Max Clutch Engage RPM." This alternative method has the advantage of not requiring pre-configuration and testing of the full engagement time/distance and PWM parameters described above.

Accordingly, the Loaded Engine Feedback Approach method may include the following steps, some of which may be performed simultaneously or in a different order. These steps may be performed using system 100, e.g., by programming control system 106 accordingly.

A first step includes monitoring the engine speed (RPM) and automatically actuating the clutch using the linear actuator when the RPM is between a Clutch Engage RPM and a Max Clutch Engage RPM.

A second step includes automatically pausing clutch engagement in response to a determination that the RPM is less than a Min Clutch Engage RPM.

A third step includes automatically pausing clutch engagement whenever the RPM exceeds the Max Clutch RPM.

A fourth step includes automatically resuming clutch engagement in response to a determination that the RPM is above the Clutch Engage RPM.

These steps may be performed until the clutch is fully engaged, at which point a standard operating mode may be entered.

E. Illustrative Data Processing System

Figure 5:
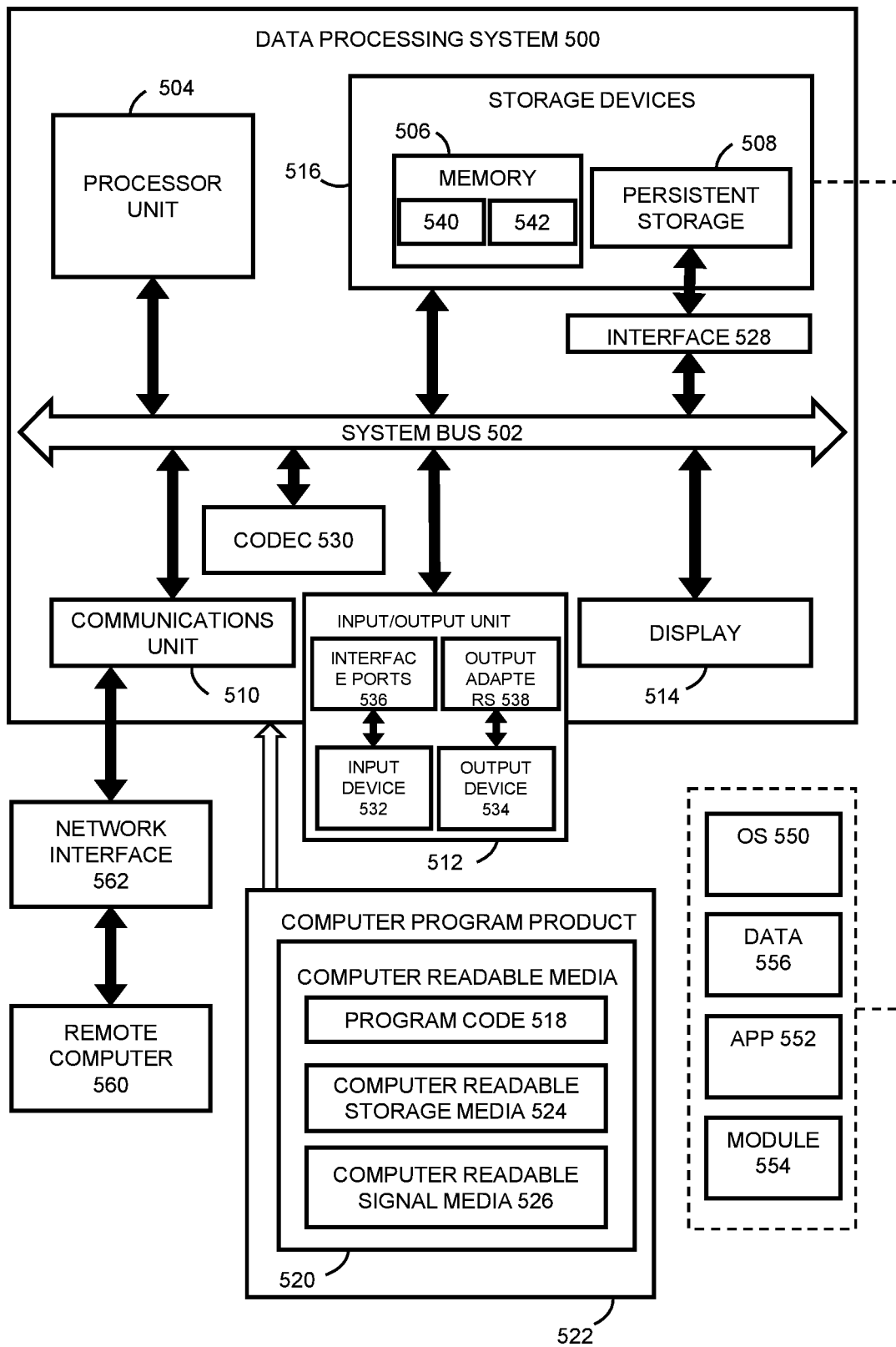
FIG. 5 is a schematic diagram of an illustrative data processing system suitable for use with the present disclosure.

As shown in FIG. 5, this example describes a data processing system 500 (also referred to as a computer, computing system, and/or computer system) suitable for use with aspects of the present disclosure. In this example, data processing system 500 is an illustrative data processing system suitable for implementing aspects of the frost fan engine controller described above. More specifically, in some examples, devices that are embodiments of data processing systems (e.g., smartphones, tablets, personal computers, programmable logic controllers) may be utilized as controllers and/or control modules, and/or to store files, execute algorithm(s), display GUI elements, and/or communicate with the frost fan engine and/or clutch in accordance with aspects of the present disclosure.

In this illustrative example, data processing system 500 includes a system bus 502 (also referred to as communications framework). System bus 502 may provide communications between a processor unit 504 (also referred to as a processor or processors), a memory 506, a persistent storage 508, a communications unit 510, an input/output (I/O) unit 512, a codec 530, and/or a display 514. Memory 506, persistent storage 508, communications unit 510, input/output (I/O) unit 512, display 514, and codec 530 are examples of resources that may be accessible by processor unit 504 via system bus 502.

Processor unit 504 serves to run instructions that may be loaded into memory 506. Processor unit 504 may comprise a number of processors, a multi-processor core, and/or a particular type of processor or processors (e.g., a central processing unit (CPU), graphics processing unit (GPU), etc.), depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device may include any suitable hardware capable of storing information (e.g., digital information), such as data, program code in functional form, and/or other suitable information, either on a temporary basis or a permanent basis.

Storage devices 516 also may be referred to as computer-readable storage devices or computer-readable media. Memory 506 may include a volatile storage memory 540 and a non-volatile memory 542. In some examples, a basic input/output system (BIOS), containing the basic routines to transfer information between elements within the data processing system 500, such as during start-up, may be stored in non-volatile memory 542. Persistent storage 508 may take various forms, depending on the particular implementation.

Persistent storage 508 may contain one or more components or devices. For example, persistent storage 508 may include one or more devices such as a magnetic disk drive (also referred to as a hard disk drive or HDD), solid state disk (SSD), floppy disk drive, tape drive, flash memory card, memory stick, USB flash drive, and/or the like, or any combination of these. One or more of these devices may be removable and/or portable, e.g., a removable hard drive. Persistent storage 508 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 508 to system bus 502, a removable or non-removable interface is typically used, such as interface 528.

Input/output (I/O) unit 512 allows for input and output of data with other devices that may be connected to data processing system 500 (i.e., input devices and output devices). For example, input device 532 may include one or more pointing and/or information-input devices such as a keyboard, a mouse, a trackball, stylus, touch pad or touch screen, touch keypad, microphone, joystick, game pad, satellite dish, scanner, TV tuner card, digital camera, digital video camera, web camera, and/or the like. These and other input devices may connect to processor unit 504 through system bus 502 via interface port(s) 536. Interface port(s) 536 may include, for example, a serial port, a parallel port, a game port, and/or a universal serial bus (USB).

Output devices 534 may use some of the same types of ports, and in some cases the same actual ports, as input device(s) 532. For example, a USB port may be used to provide input to data processing system 500 and to output information from data processing system 500 to an output device 534. Output adapter 538 is provided to illustrate that there are some output devices 534 (e.g., monitors, speakers, and printers, among others) which require special adapters. Output adapters 538 may include, e.g. video and sounds cards that provide a means of connection between the output device 534 and system bus 502. Other devices and/or systems of devices may provide both input and output capabilities, such as remote computer(s) 560. Display 514 may include any suitable human-machine interface or other mechanism configured to display information to a user, e.g., a CRT, LED, or LCD monitor or screen, etc.

Communications unit 510 refers to any suitable hardware and/or software employed to provide for communications with other data processing systems or devices. While communication unit 510 is shown inside data processing system 500, it may in some examples be at least partially external to data processing system 500. Communications unit 510 may include internal and external technologies, e.g., modems (including regular telephone grade modems, cable modems, and DSL modems), ISDN adapters, and/or wired and wireless Ethernet cards, hubs, routers, etc. Data processing system 500 may operate in a networked environment, using logical connections to one or more remote computers 560. A remote computer(s) 560 may include a personal computer (PC), a server, a router, a network PC, a workstation, a microprocessor-based appliance, a peer device, a smart phone, a tablet, another network note, and/or the like. Remote computer(s) 560 typically include many of the elements described relative to data processing system 500. Remote computer(s) 560 may be logically connected to data processing system 500 through a network interface 562 which is connected to data processing system 500 via communications unit 510. Network interface 562 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 530 may include an encoder, a decoder, or both, comprising hardware, software, or a combination of hardware and software. Codec 530 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 530 is depicted as a separate component, codec 530 may be contained or implemented in memory, e.g., non-volatile memory 542.

Non-volatile memory 542 may include read only memory (ROM), programmable ROM (PROM), electrically programmable ROM (EPROM), electrically erasable programmable ROM (EEPROM), flash memory, and/or the like, or any combination of these. Volatile memory 540 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 516, which are in communication with processor unit 504 through system bus 502. In these illustrative examples, the instructions are in a functional form in persistent storage 508. These instructions may be loaded into memory 506 for execution by processor unit 504. Processes of one or more embodiments of the present disclosure may be performed by processor unit 504 using computer-implemented instructions, which may be located in a memory, such as memory 506.

These instructions are referred to as program instructions, program code, computer usable program code, or computer-readable program code executed by a processor in processor unit 504. The program code in the different embodiments may be embodied on different physical or computer-readable storage media, such as memory 506 or persistent storage 508. Program code 518 may be located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may comprise computer-readable storage media 524 or computer-readable signal media 526.

Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive (e.g., a USB flash drive), or a flash memory, that is connected to data processing system 500. In some instances, computer-readable storage media 524 may not be removable from data processing system 500.

In these examples, computer-readable storage media 524 is a non-transitory, physical or tangible storage device used to store program code 518 rather than a medium that propagates or transmits program code 518. Computer-readable storage media 524 is also referred to as a computer-readable tangible storage device or a computer-readable physical storage device. In other words, computer-readable storage media 524 is media that can be touched by a person.

Alternatively, program code 518 may be transferred to data processing system 500, e.g., remotely over a network, using computer-readable signal media 526. Computer-readable signal media 526 may be, for example, a propagated data signal containing program code 518. For example, computer-readable signal media 526 may be an electromagnetic signal, an optical signal, and/or any other suitable type of signal. These signals may be transmitted over communications links, such as wireless communications links, systems using LoRa wireless data communication technology, cellular communication networks, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer-readable signal media 526 for use within data processing system 500. For instance, program code stored in a computer-readable storage medium in a server data processing system may be downloaded over a network from the server to data processing system 500. The computer providing program code 518 may be a server computer, a client computer, or some other device capable of storing and transmitting program code 518.

In some examples, program code 18 may comprise be an operating system (OS) 550. Operating system 550, which may be stored on persistent storage 508, controls and allocates resources of data processing system 500. One or more applications 552 take advantage of the operating system's management of resources via program modules 554, and program data 556 stored on storage devices 516. OS 550 may include any suitable software system configured to manage and expose hardware resources of computer 500 for sharing and use by applications 552. In some examples, OS 550 provides application programming interfaces (APIs) that facilitate connection of different type of hardware and/or provide applications 552 access to hardware and OS services. In some examples, certain applications 552 may provide further services for use by other applications 552, e.g., as is the case with so-called "middleware." Aspects of present disclosure may be implemented with respect to various operating systems or combinations of operating systems.

The different components illustrated for data processing system 500 are not meant to provide architectural limitations to the manner in which different embodiments may be implemented. One or more embodiments of the present disclosure may be implemented in a data processing system that includes fewer components or includes components in addition to and/or in place of those illustrated for computer 500. Other components shown in FIG. 5 can be varied from the examples depicted. Different embodiments may be implemented using any hardware device or system capable of running program code. As one example, data processing system 500 may include organic components integrated with inorganic components and/or may be comprised entirely of organic components (excluding a human being). For example, a storage device may be comprised of an organic semiconductor.

In some examples, processor unit 504 may take the form of a hardware unit having hardware circuits that are specifically manufactured or configured for a particular use, or to produce a particular outcome or progress. This type of hardware may perform operations without needing program code 518 to be loaded into a memory from a storage device to be configured to perform the operations. For example, processor unit 504 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 518) may be implemented as hardware, e.g., by specifying an FPGA configuration using a hardware description language (HDL) and then using a resulting binary file to (re)configure the FPGA.

In another example, data processing system 500 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, system bus 502 may comprise one or more buses, such as a system bus or an input/output bus. Of course, the bus system may be implemented using any suitable type of architecture that provides for a transfer of data between different components or devices attached to the bus system. System bus 502 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in system bus 502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

F. Illustrative Programmable Logic Controller

Figure 6:
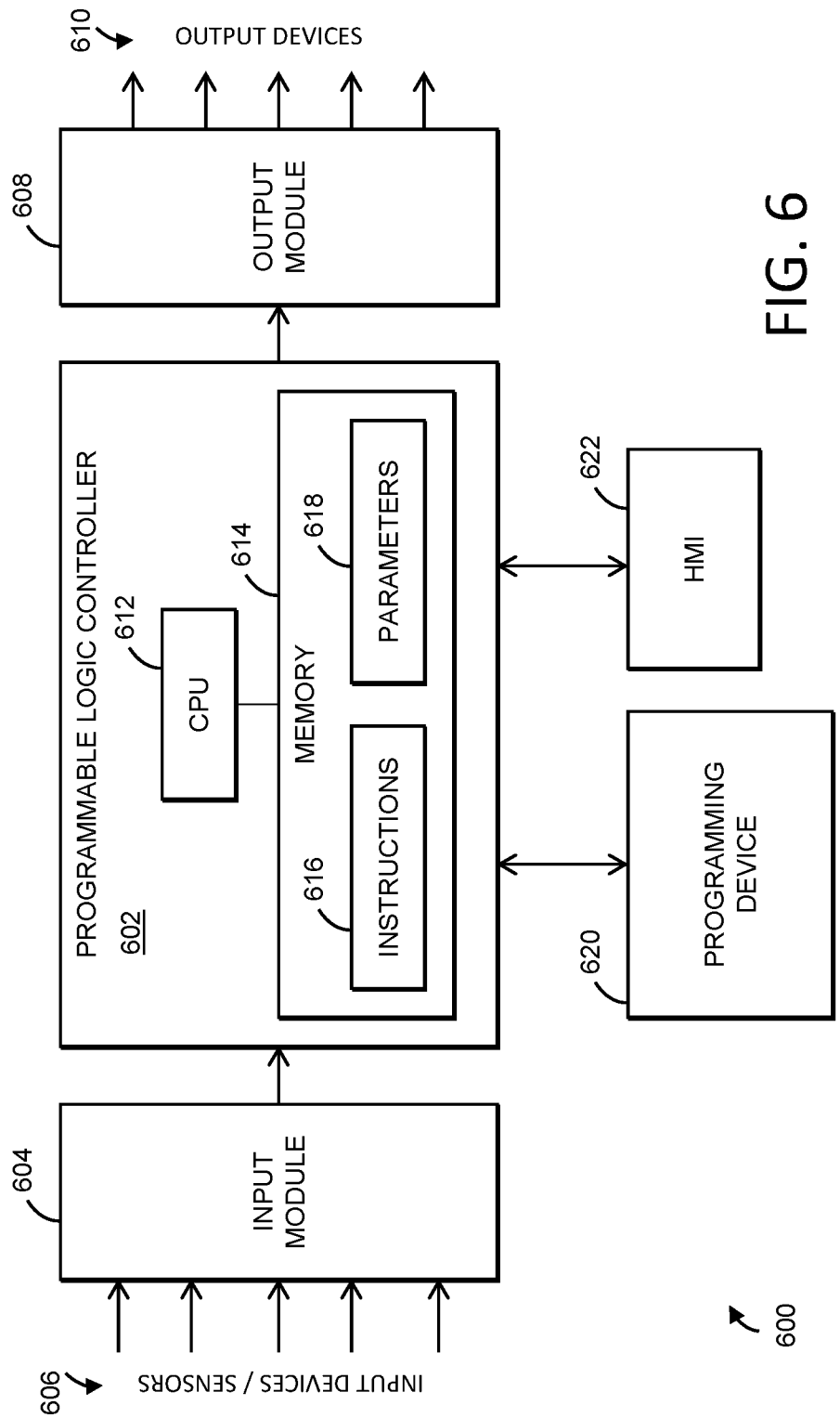
FIG. 6 is a schematic diagram of a programmable logic controller (PLC) suitable for use with the present disclosure.

As shown in FIG. 6, this section describes an illustrative programmable logic controller system 600 (also referred to as a PLC system) suitable for implementing aspects of automatic frost fan engine controls in accordance with aspects of the present disclosure. PLC system 600 is a programmable controller used for automation of typical industrial processes, and is an embodiment of data processing system 500, described above. In some examples, one or more devices that embody a PLC system may be included in control system 106, e.g., to carry out algorithms described above.

In this illustrative example, PLC system 600 includes a programmable logic controller (PLC) 602, also referred to as a controller. PLC 602 includes a central processing unit (CPU) 612, and a memory 614 for storing instructions 616 and parameters 618 necessary to carry out the relevant automation tasks.

Central processing unit 612 is an example of processor unit 504, described above, and serves to execute software programs in the form of instructions 616. The software programs may be loaded into memory 614. Memory 614, which is an example of storage device 516 described above, may also store parameters 618 needed for operation. A programming device 620 may interface with PLC 602 to facilitate the input of instructions and settings and/or to monitor equipment operation. Programming device 620 may include, for example, a handheld computer or personal computer.

A human machine interface (HMI) 622 may also be placed in communication with PLC 602. HMI 622 facilitates a user-friendly and interactive interface with the system processes and controls. Human machine interface 622 may also assist an operator in determining machine conditions, in changing machine settings, and/or displaying faults.

PLC system 600 includes an input module 604 in receiving communication with one or more input devices/sensors 606, and an output module 608 in outgoing communication with one or more output devices 610. Both modules 604 and 608 are hardware devices in communication with PLC 602. In some examples, communication with PLC 602 may be carried out via an optical (or otherwise wireless) interface, such that PLC 602 is electrically isolated from the input and output modules.

Input module 604 may convert analog signals from input devices/sensors 606 into digital and/or logic signals that the PLC can use. Signal types may be digital or analog. With these signals the CPU may evaluate the status of the inputs. Upon evaluating the input(s), along with known output states and stored program parameters and instructions, the CPU may execute one or more predetermined commands to control the one or more output devices. Output module 608 may convert control signals from the CPU into digital or analog signals which may be used to control the various output devices.

HMI 622 and programming device 620 may provide for communications with other data processing systems or devices, e.g., through the use of physical and/or wireless communications links.

Modules 604 and 608 allow for input and output of data with other devices that may be connected to PLC 602. For example, input module 604 may provide a connection for temperature or pressure measurements, valve or machine status, tank level status, user input through a keyboard, a mouse, and/or any other suitable input device. Output module 608 may send output to an actuator, indicator, motor controller, printer, machine, display, and/or any other suitable output device.

G. Illustrative Linear Actuator and Clutch Mechanism

Figure 7:
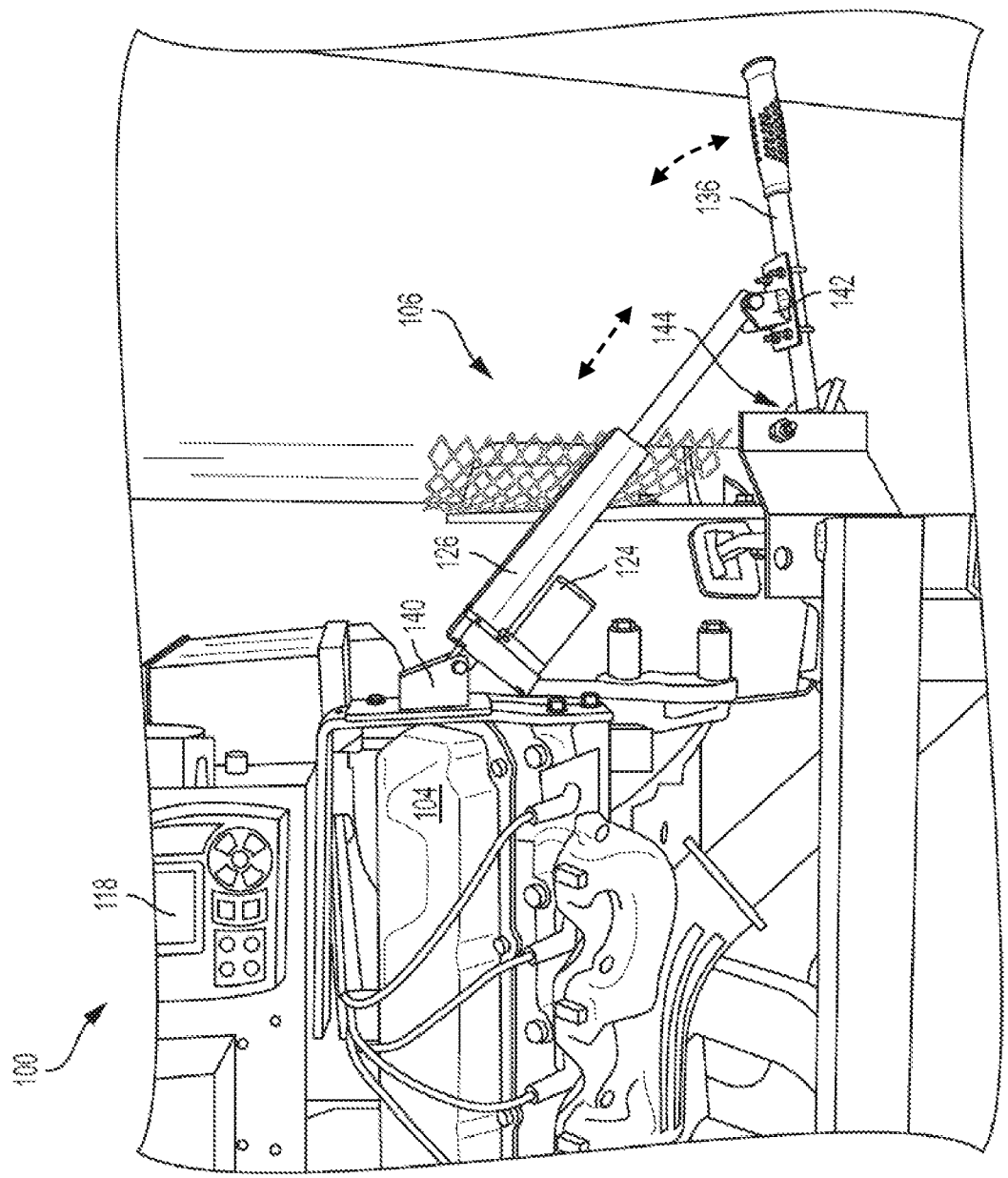
FIG. 7 depicts a portion of an illustrative frost fan system having a clutch control system in accordance with aspects of the present disclosure.

As shown in FIG. 7, this section describes an illustrative embodiment of a portion of frost fan 100 and clutch control system 106. Specifically, FIG. 7 is a side elevation view showing engine 104, DC motor 124, linear actuator 126, clutch engagement mechanism 136, and HMI 118.

As depicted in FIG. 7, linear actuator 126 is pivotably coupled to a structure of engine 104 by a first pivotable connector 140 and to clutch engagement mechanism 136 by a second pivotable connector 142. Accordingly, extension or retraction of linear actuator 126 will cause the handle of clutch engagement mechanism 136 to pivot on its own pivot 144, thereby causing the clutch to become more or less engaged.

FIG. 7 depicts one example of how the clutch control system of the present disclosure may be straightforwardly retrofitted onto an existing fan system. For example, mechanical connection of the linear actuator may be accomplished using readily available couplers.

H. Additional Examples and Illustrative Combinations

This section describes additional aspects and features of frost fan engine control systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A high-inertia fan system comprising:

a fan blade assembly including a plurality of fan blades rotatably coupled to a reduction gear;

an engine configured to spin the fan blade assembly via the reduction gear;

a clutch assembly configured to selectively engage a drive shaft of the engine with a load shaft of the reduction gear, the clutch assembly comprising a non-centrifugal, friction clutch operable by a linear actuator driven by a direct current (DC) motor and operatively connected to the clutch;

a thermostat configured to sense an ambient temperature; and an electronic controller in communication with the thermostat, the engine, and the clutch assembly, the controller having one or more processors and a memory, a plurality of instructions being stored in the memory and executable by the one or more processors to automatically:

disengage the clutch in response to a first signal from the thermostat that the ambient temperature has fallen below a first threshold;

start the engine and adjust a speed of the engine by controlling a fuel throttle of the engine;

cause the linear actuator to actuate the clutch at a first actuation speed for a first duration, then actuate the clutch at a second actuation speed lower than the first actuation speed for a second duration, then actuate the clutch at a third actuation speed higher than the second actuation speed for a third duration, such that the fan blades are brought up to an operating speed without stalling the engine;

run the fan blade assembly at an operating speed;

slow the speed of the engine and disengage the clutch in response to a second signal from the thermostat that the ambient temperature has risen above a second threshold; and engage the clutch in response to stopping of the engine and the fan blade assembly, thereby preventing rotation of the fan blades.

A1. The system of A0, wherein the linear actuator is operatively connected to the clutch via a clutch engagement handle.

A2. The system according to any one of paragraphs A0 through A1, wherein automatically causing the linear actuator to actuate the clutch at the second actuation speed comprises repeatedly alternating a voltage to the DC motor between an on pulse and an off pulse.

A3. The system according to any one of paragraphs A0 through A2, wherein a duration of each on pulse is selectable by a user.

A4. The system according to any one of paragraphs A0 through A3, wherein the first, second, and third durations are selectable by a user.

A5. The system according to any one of paragraphs A0 through A4, wherein the third actuation speed is the same as the first actuation speed.

A6. The system according to any one of paragraphs A0 through A5, further comprising one or more batteries configured to provide electrical power to the thermostat and the controller.

A7. The system of A6, wherein the controller is further configured to enter a standby mode after engaging the clutch in response to stopping of the engine and the fan blade assembly, such that substantially only the thermostat is powered by the one or more batteries.

A8. The system of A7, wherein the controller is further configured to exit the standby mode and draw power from the one or more batteries in response to the first signal from the thermostat.

B0. A frost fan system for protecting crops from frost, the system comprising:

a fan blade assembly including a plurality of fan blades rotatably coupled to a reduction gear;

an engine configured to spin the fan blade assembly via the reduction gear;

a clutch assembly configured to selectively engage a drive shaft of the engine with a load shaft of the reduction gear, the clutch assembly comprising a non-centrifugal, friction clutch and a manual clutch engagement mechanism;

an environmental sensor configured to sense an environmental parameter;

a clutch control system including a linear actuator coupled to the clutch engagement mechanism, the clutch control system further comprising an electronic controller in communication with the environmental sensor and the engine;

wherein the electronic controller is configured to automatically:

start the engine in response to a signal from the environmental sensor indicating that the environmental parameter has met a first threshold;

engage the clutch by causing the linear actuator to move the clutch engagement mechanism into an engaged position;

run the fan blade assembly at an operating speed; and slow the engine and disengage the clutch in response to a second signal from the environmental sensor that the environmental parameter has met a second threshold.

B1. The system of B0, wherein the electronic controller is further configured, in response to a stopping of the engine and of the fan blade assembly, to automatically engage the clutch by causing the linear actuator to move the clutch engagement mechanism into the engaged position, thereby preventing rotation of the fan blades.

B2. The system B1, wherein the controller is further configured to place the system into a low-power standby mode after engaging the clutch in response to stopping of the engine and the fan blade assembly, such that only the environmental sensor is drawing any substantial power from a battery electrically coupled to the system.

B3. The system according to any one of paragraphs B0 through B2, wherein the environmental sensor comprises a thermostat and the environmental parameter is an ambient temperature.

B4. The system according to any one of paragraphs B0 through B3, wherein the linear actuator is controlled by an electric motor, and engaging the clutch includes driving the motor at a selected speed.

B5. The system of B4, wherein the controller is further configured to provide a drive voltage of the electric motor at pulsed intervals each having a selected duration.

B6. The system according to any one of paragraphs B0 through B5, wherein engaging the clutch includes disengaging the clutch when a speed of the engine drops below a first revolutions per minute (RPM) threshold.

B7. The system of B6, wherein engaging the clutch further includes reengaging the clutch when the speed of the engine rises above a second RPM threshold.

C0. A method of retrofitting a clutch control system on a non-centrifugal clutch, the method comprising:

coupling a motor-driven linear actuator to a manual clutch engagement mechanism of a non-centrifugal clutch of a frost fan assembly;

placing an electronic controller in communication with an engine configured to drive the frost fan assembly and with a motor of the motor-driven linear actuator; and using the electronic controller to automatically selectively engage and disengage the clutch by controlling the motor to cause the linear actuator to position the manual clutch engagement mechanism.

C1. The method of C0, wherein coupling the motor-driven linear actuator to the manual clutch engagement mechanism comprises connecting an end of the linear actuator to a handle of the manual clutch engagement mechanism.

C2. The method according to any one of paragraphs C0 through C1, wherein automatically selectively engaging and disengaging the clutch comprises:

driving the motor at a first actuation speed for a first duration to bring the clutch to near engagement, driving the motor at a second actuation speed lower than the first duration for a second duration to partially engage the clutch, and driving the motor at a third actuation speed higher than the second actuation speed for a third duration to fully engage the clutch.

C3. The method according to any one of paragraphs C0 through C2, wherein automatically selectively engaging and disengaging the clutch comprises:

automatically engaging the clutch when the engine is above a first revolutions per minute (RPM) threshold;

automatically disengaging the clutch when the engine falls below a second RPM threshold;

automatically reengaging the clutch when the engine rises above a third RPM threshold.

C4. The method according to any one of paragraphs C0 through C3, further comprising:

automatically reporting, from the clutch control system to a remote monitoring station at a selected periodicity, information relating to the clutch control system;

wherein the selected periodicity is automatically adjusted based on a manual setting, an environmental temperature, a time of day, or a season.

C5. The method of C4, further comprising powering down components of the reporting system between reporting events, such that overall power usage is reduced.

Advantages, Features, Benefits

The different embodiments and examples of the frost fan engine control system described herein provide several advantages over known solutions for automatic control of frost fans. For example, illustrative embodiments and examples described herein allow an operator to save fuel by starting and stopping their fans automatically, based on the actual temperature.

Additionally, and among other benefits, illustrative embodiments and examples described herein allow an operator to save labor by not visiting each fan each time the temperature changes in order to turn the fans on or off.

Additionally, and among other benefits, illustrative embodiments and examples described herein allow for a self-contained system that can be installed in an hour or two by an installer of moderate experience.

Additionally, and among other benefits, illustrative embodiments and examples described herein allow the system to be retrofitted to existing manual clutches.

Additionally, and among other benefits, illustrative embodiments and examples described herein allow for a reliable automatic start and/or stop for a motor such as might be used for a frost fan or for an irrigation pump.

Additionally, and among other benefits, illustrative embodiments and examples described herein allows for automated control of a standard engine clutch by using linear actuators attached to existing manual control levers and algorithms installed in an engine control box.

Additionally, and among other benefits, illustrative embodiments and examples described herein allow a fan portion of the frost fan to be locked when the system is off and thereby prevents additional, unnecessary wear on the gearbox.

Additionally, and among other benefits, illustrative embodiments and examples described herein allow an operator to avoid the high cost of purchasing and installing a centrifugal clutch.

Additionally, and among other benefits, illustrative embodiments and examples described herein allow an engine with a manual clutch to operate a heavy fan without stalling.

Additionally, and among other benefits, illustrative embodiments and examples described herein allow a clutch to "slip" through use of a clutch slip algorithm.

Additionally, and among other benefits, illustrative embodiments and examples described herein allow an operator to adjust the parameters of the slip algorithm in order to adjust for different sizes and/or weights of fans.

No known system or device can perform these functions, particularly in a self-contained, easy-to-install format that can be used with manual clutches. Thus, the illustrative embodiments and examples described herein are particularly useful for retrofitting to existing frost fans with manual clutches. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A high-inertia fan system comprising:

a fan blade assembly including a plurality of fan blades rotatably coupled to a reduction gear;

an engine configured to spin the fan blade assembly via the reduction gear;

a clutch assembly configured to selectively engage a drive shaft of the engine with a load shaft of the reduction gear, the clutch assembly comprising a non-centrifugal, friction clutch operable by a linear actuator driven by a direct current (DC) motor and operatively connected to the clutch;

a thermostat configured to sense an ambient temperature; and an electronic controller in communication with the thermostat, the engine, and the clutch assembly, the controller having one or more processors and a memory, a plurality of instructions being stored in the memory and executable by the one or more processors to automatically:

disengage the clutch in response to a first signal from the thermostat that the ambient temperature has fallen below a first threshold;

start the engine and adjust a speed of the engine by controlling a fuel throttle of the engine;

cause the linear actuator to actuate the clutch at a first speed of the actuator for a first duration, then actuate the clutch at a second speed of the actuator lower than the first speed of the actuator for a second duration, then actuate the clutch at a third speed of the actuator higher than the second speed of the actuator for a third duration, such that the fan blades are brought up to an operating fan speed without stalling the engine;

run the fan blade assembly at the operating fan speed;

slow the speed of the engine and disengage the clutch in response to a second signal from the thermostat that the ambient temperature has risen above a second threshold; and engage the clutch in response to stopping of the engine and the fan blade assembly, thereby preventing rotation of the fan blades.

2. The system of claim 1, wherein the linear actuator is operatively connected to the clutch via a clutch engagement handle.

3. The system of claim 1, wherein automatically causing the linear actuator to actuate the clutch at the second speed comprises repeatedly alternating a voltage to the DC motor between an on pulse and an off pulse.

4. The system of claim 3, wherein a duration of each on pulse is selectable by a user.

5. The system of claim 1, wherein the first, second, and third durations are selectable by a user.

6. The system of claim 1, wherein the third speed is the same as the first speed.

7. The system of claim 1, further comprising one or more batteries configured to provide electrical power to the thermostat and the controller.

8. The system of claim 7, wherein the controller is further configured to enter a standby mode after engaging the clutch in response to stopping of the engine and the fan blade assembly, such that only the thermostat is powered by the one or more batteries.

9. The system of claim 8, wherein the controller is further configured to exit the standby mode and draw power from the one or more batteries in response to the first signal from the thermostat.

10. A frost fan system for protecting crops from frost, the system comprising:

a fan blade assembly including a plurality of fan blades rotatably coupled to a reduction gear;

an engine configured to spin the fan blade assembly via the reduction gear;

a clutch assembly configured to selectively engage a drive shaft of the engine with a load shaft of the reduction gear, the clutch assembly comprising a non-centrifugal, friction clutch and a manual clutch engagement mechanism;

an environmental sensor configured to sense an environmental parameter;

a clutch control system including a linear actuator coupled to the manual clutch engagement mechanism, the clutch control system further comprising an electronic controller in communication with the environmental sensor and the engine;

wherein the electronic controller is configured to automatically:

start the engine in response to a signal from the environmental sensor indicating that the environmental parameter has met a first threshold;

engage the clutch by causing the linear actuator to move the manual clutch engagement mechanism into an engaged position;

run the fan blade assembly at an operating speed; and slow the engine and disengage the clutch in response to a second signal from the environmental sensor that the environmental parameter has met a second threshold.

11. The system of claim 10, wherein the electronic controller is further configured, in response to a stopping of the engine and of the fan blade assembly, to automatically engage the clutch by causing the linear actuator to move the manual clutch engagement mechanism into the engaged position, thereby preventing rotation of the fan blades.

12. The system of claim 11, wherein the electronic controller is further configured to place the system into a low-power standby mode after engaging the clutch in response to stopping of the engine and the fan blade assembly, such that only the environmental sensor is drawing power from a battery electrically coupled to the system.

13. The system of claim 10, wherein the environmental sensor comprises a thermostat and the environmental parameter is an ambient temperature.

14. The system of claim 10, wherein the linear actuator is controlled by an electric motor, and engaging the clutch includes driving the motor at a selected speed.

15. The system of claim 14, wherein the electronic controller is further configured to provide a drive voltage of the electric motor at pulsed intervals each having a selected duration.

16. The system of claim 10, wherein engaging the clutch includes disengaging the clutch when a speed of the engine drops below a first revolutions per minute (RPM) threshold.

17. The system of claim 16, wherein engaging the clutch further includes reengaging the clutch when the speed of the engine rises above a second RPM threshold.

18. The system of claim 14, wherein the electronic controller is further configured such that automatically engaging the clutch includes:

driving the motor at a first actuation speed for a first duration to bring the clutch to near engagement, driving the motor at a second speed lower than the first duration actuation speed for a second duration to partially engage the clutch, and driving the motor at a third actuation speed higher than the second actuation speed for a third duration to fully engage the clutch.

19. The system of claim 10, wherein the electronic controller is further configured such that automatically engaging the clutch includes:

automatically engaging the clutch when the engine is above a first revolutions per minute (RPM) threshold;

automatically disengaging the clutch when the engine falls below a second RPM threshold; and automatically reengaging the clutch when the engine rises above a third RPM threshold.

20. The system of claim 10, wherein the electronic controller is further configured to:

automatically report, to a remote monitoring station at a selected periodicity, information relating to the clutch control system;

wherein the selected periodicity is automatically adjusted by the electronic controller based on a manual setting, the sensed environmental parameter, a time of day, or a season.

* * * * *

UNITED STATES PATENT AND TRADEMARK OFFICE
CERTIFICATE OF CORRECTION

PATENT NO. : 10,753,366 B2  
APPLICATION NO. : 16/047147  
DATED : August 25, 2020  
INVENTOR(S) : Gary Gottschalk It is certified that error appears in the above-identified patent and that said Letters Patent is hereby corrected as shown below:

In the Claims

Column 26, Lines 41-42, Claim 18: the text "driving the motor at a second speed lower than the first duration actuation speed" should read --driving the motor at a second actuation speed lower than the first actuation speed--.

Signed and Sealed this  
Twenty-second Day of December, 2020

Andrei Iancu  
*Director of the United States Patent and Trademark Office*